(No Model.) 2 Sheets—Sheet 2.
B. N. SHELLEY.
VEHICLE WHEEL.
No. 270,493. Patented Jan. 9, 1883.
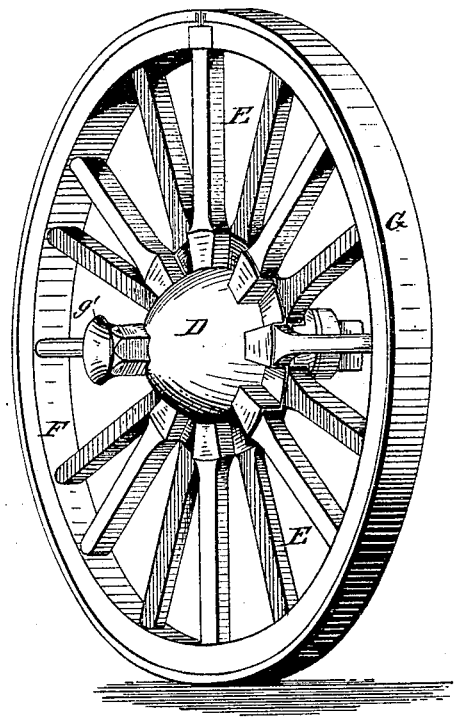
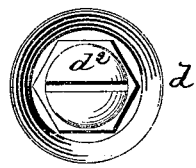
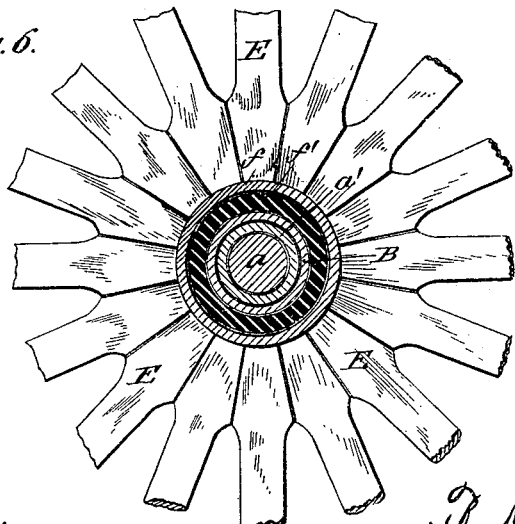
WITNESSES:
Thos Houghton.
A. G. Lyne.
INVENTOR:
B. N. Shelley
BY
ATTORNEYS.

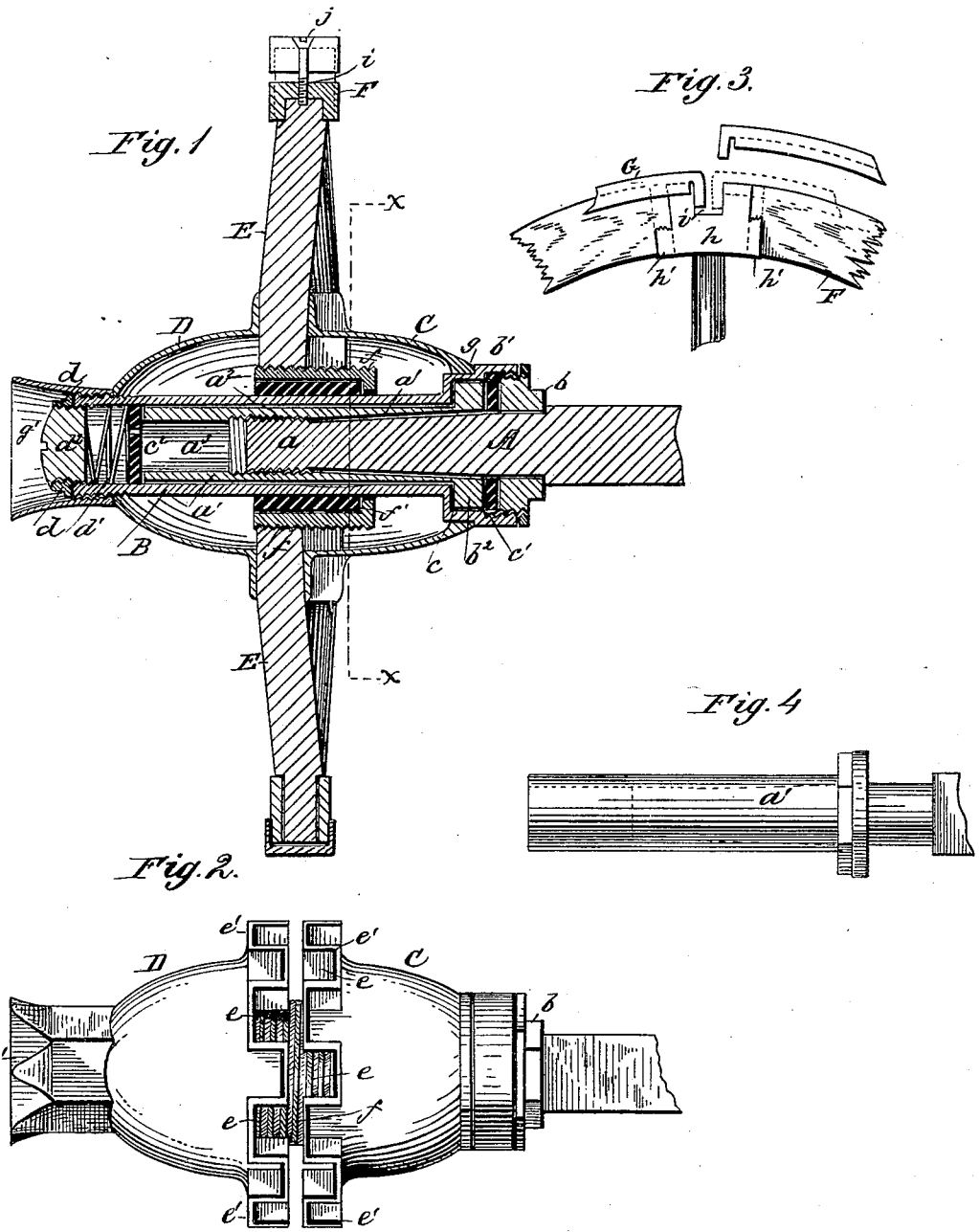

UNITED STATES PATENT OFFICE.

BENJAMIN N. SHELLEY, OF ANDERSON, INDIANA.

VEHICLE-WHEEL.

SPECIFICATION forming part of Letters Patent No. 270,493, dated January 9, 1883.

Application filed May 1, 1882. (No model.)

*To all whom it may concern:*

Be it known that I, BENJAMIN NEWTON SHELLEY, of Anderson, in the county of Madison and State of Indiana, have invented a new and useful Improvement in Vehicles, of which the following is a full, clear, and exact description, reference being had to the annexed drawings, forming part of this specification.

This invention relates to an improvement in vehicles, particularly to the novel construction and combination of a vehicle-wheel and self-lubricating axle.

In the drawings, Figure 1 is a longitudinal section through the box and axle; Fig. 2, a side elevation of the hub with the spokes removed; Figs. 3 and 4, detail views; Fig. 5, a perspective of the wheel; Fig. 6, a view of the wheel in section on line $x\ x$, Fig. 1, with the tire broken away; and Fig. 7, a detail.

A represents a tapering spindle, having a cylindrical threaded portion, $a$, at its front end, over which is screwed a close-fitting cylindrical sleeve, $a'$, having a corresponding female thread at $a^2$. This sleeve is made somewhat longer than the spindle, in order that when the parts are thus secured together an oil-reservoir, $a^3$, shall be formed in the end of the axle. The spindle A is made tapering, and is provided with a thread only at its front end, in order that a close oil-tight joint shall be formed between the same and the sleeve $a'$, which has a corresponding bore to receive the spindle. Heretofore a cylindrical spindle having a thread extending from one end to the other has been used in connection with a threaded sleeve; but the thread forms a channel for the passage of oil, and is therefore objectionable. By using a smooth tapering spindle a perfectly-tight joint can be formed between it and the sleeve by means of the small threaded portion $a$ at the front end of the spindle and the thread $a^2$ within the sleeve. The back end of the spindle is provided with a nut, $b$, and a leather or other suitable washer, $b'$, which are to be placed in position before the sleeve is screwed on the spindle, while the sleeve is constructed with an annular collar, $b^2$, against which the box of the wheel is to be held by the nut $b$ in the usual manner, and between which and the nut the washer is to be compressed to form a tight joint. The sleeve $a'$ is to be provided with a suitable angular projection on the side of the annular collar $b^2$ toward the front end of the axle, as shown in Fig. 4, whereby the sleeve may be rotated on the spindle with an ordinary wrench in adjusting said parts. With this construction the sleeve $a'$, which is to be made of the hardest steel, will support the entire wear of the axle, and the latter may be repaired and used for an indefinite period by simply substituting a new sleeve for an old one.

A second cylindrical sleeve, B, forming the box of the hub, is provided with annular offsets $c\ c'$—the former for receiving the collar $b^2$ on the sleeve $a'$, and the latter, which is threaded, for receiving the washer $b'$ and the nut $b$, by the latter of which the wheel is to be secured to the axle. The opposite end of the sleeve B is threaded within and without, as shown. Before placing the sleeve B upon the axle a leather disk, $c^2$, having a single perforation and exactly fitting the bore of sleeve B, is inserted into the latter, at the back end thereof, and moved to the opposite end against the internal thread at said end, which serves as a shoulder, by the act of placing the box B or the entire wheel upon the axle. This disk serves to close the oil-reservoir $a^3$, and the perforation therein, which is located near its periphery, is to receive the nozzle of the oil-can when the reservoir is to be supplied with oil. By means of the internal thread of the box B a plug, $d^2$, screwing into the nut $d$, is to be used for holding the disk $c^2$ in comparatively close contact with the end of the axle, to allow the oil to be fed gradually from the reservoir as it may be needed. The nut $d$ serves to limit the action of the plug upon the disk, and by this means the joint between the disk and the front end of sleeve $a'$ can be kept sufficiently tight as long as the disk lasts. The action of the plug $d^2$ upon the box B and the sleeve $a'$ tends to tighten the joints at both the washer $b'$ and the disk $c^2$, which also serves as a washer, so that as the latter gradually wears out a slight movement of the plug $d^2$ from time to time will be sufficient to keep said joints at the proper adjustment. I may sometimes use also a strong spiral spring, $d'$, on the outer side of the disk, to break the force of any lateral jarring between the hub and axle. In this case the box or sleeve B will be made sufficiently short to give room for the spring, as shown in Fig. 1.

The outer portion of the wheel-hub is formed by two similar concavo-convex metal plates, C D, having rectangular recesses $e$ in their adjacent edges, and bordered with continuous zigzag flanges $e'$, forming sockets for the spokes, and so arranged with respect to each other that the spokes shall stagger, as shown in Figs. 1 and 5. The spokes E are set with their inner ends in contact with an externally-threaded sleeve, $f$, to prevent lateral displacement; and this sleeve is lined with a sheet of rubber, $f'$, to provide a cushion between said sleeve and the box B. The concavo-convex plates C D, as shown, are open at the center to receive the box B, and the plate C rests against a shoulder, $g$, at the inner end of the box B, while the plate D is to be forced against the spokes to tighten said parts by the nut $g'$ screwing on the outer end of the box.

The spokes E are provided with tenons at their outer ends, which fit in mortises in the felly F. The felly may be constructed in several pieces, if desired; but I prefer to use a single felly which shall be capable of sufficient expansion to admit the insertion of the spokes in position. This felly is so constructed that when secured to the spokes an opening shall be left between its ends, into which shall be inserted a block, $h$, having a mortise for a spoke, and a flange, $h'$, for inclosing the ends of the felly. The surface of this block in line with the periphery of the felly is provided with a recess at $i$ and a threaded perforation at $i'$, and the flanged tire G, which is cut, as shown, has its ends bent inward, whereby they may be inserted into said recess to hold the tire on the felly. A seat for a screw, $j$, is formed between the said bent ends, and when the screw is inserted in the perforation $i$ the said ends will be firmly held in place, while the flanges on each side the tire will prevent the latter from slipping from the felly. A lock-nut, $b^4$, is screwed on the nut $b$ to hold the latter in position.

Having thus described my invention, what I claim, and desire to secure by Letters Patent, is—

1. The combination, with the wheel constructed substantially as shown and described, of the axle formed with the tapering spindle threaded only at the front end, and the cylindrical shouldered sleeve, having a corresponding bore and screwing on said spindle, and provided with an annular collar at its back end, substantially as shown and described, and for the purpose set forth.

2. The combination, with the wheel constructed substantially as described, of the plain tapering spindle threaded at the front end, the sleeve screwing thereon and forming a reservoir therewith, the perforated disk closing the reservoir, and the nut having the plug screwing into the box of the wheel to hold the disk in position, substantially as shown and described, and for the purpose set forth.

3. The combination, with the wheel constructed substantially as described, of the plain tapering spindle, threaded at the front end, the sleeve screwing thereon, the disk, the nut having a threaded plug screwing into the box to hold the disk, and the spiral spring arranged between the disk and nut, substantially as shown and described, and for the purpose set forth.

4. The combination of the axle having the collar $b^2$ at the back end, the box B, the nut $b$, screwing into the back end of the box, and the nut $d$, having the plug $d^2$ screwing into the front end of the box against the front end of the axle, substantially as shown and described, and for the purpose set forth.

5. The combination, with the axle constructed as described, of the wheel formed with a box having internal and external threads, as described, the concavo-convex plates having means for holding the spokes between them, and a nut for tightening the plates against the spokes, substantially as shown and described.

6. The combination, with the axle constructed as shown and described, of the flanged concavo-convex plates, the staggered spokes arranged between the flanges of said plates, the threaded sleeve supporting the spokes, the rubber cushion lining said sleeve, and the box, substantially as described, the box being provided with a shoulder at one end and a nut at the other, whereby the said plates may be held firmly against the spokes, as set forth.

BENJAMIN NEWTON SHELLEY.

Witnesses:
A. G. LYNE,
SOLON C. KEMON.